June 6, 1939. F. C. REILLY ET AL 2,161,088
AUTOMOTIVE MECHANISM
Filed Oct. 3, 1935 4 Sheets-Sheet 4
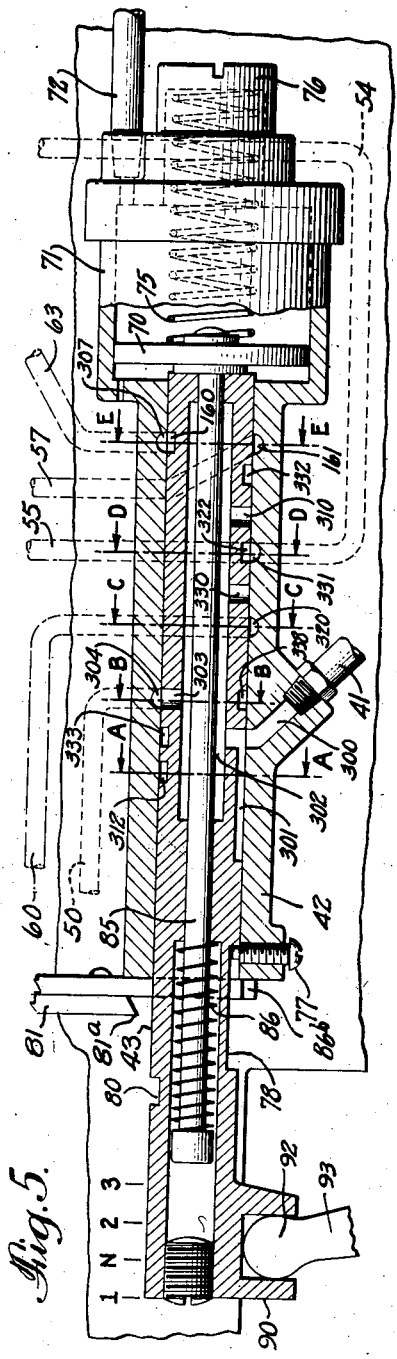
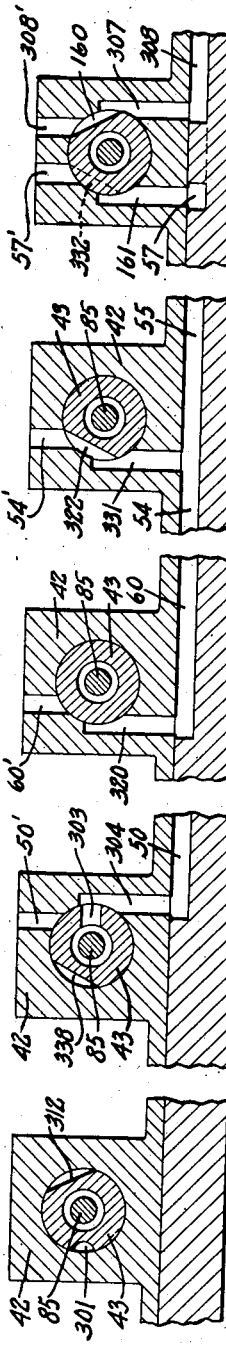
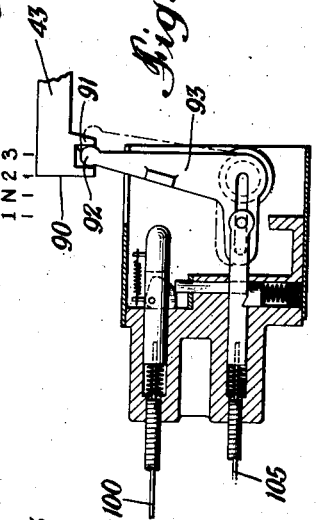
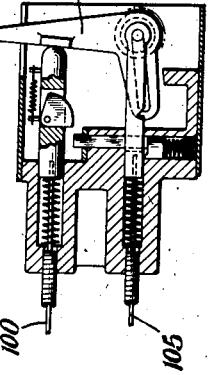

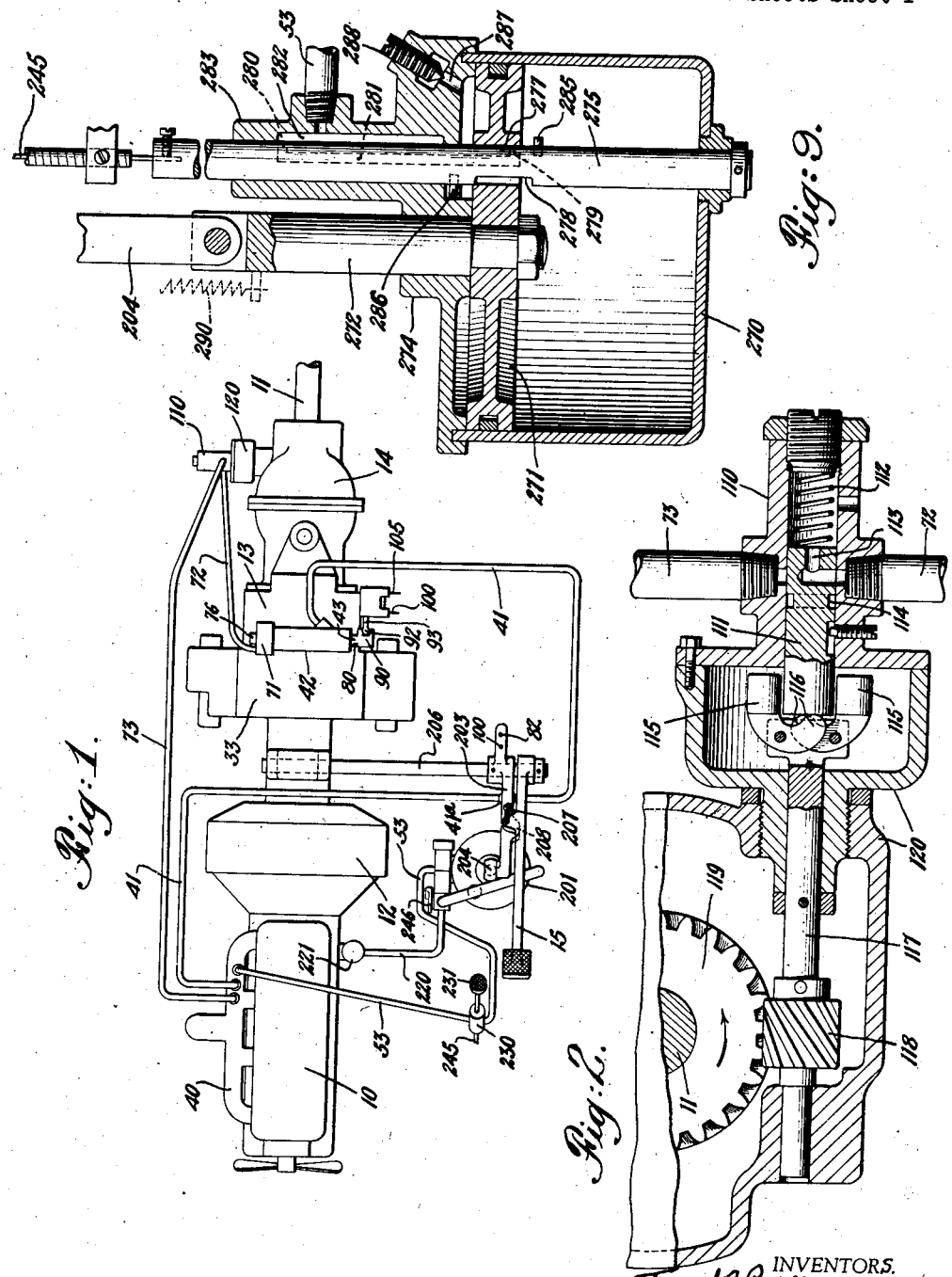

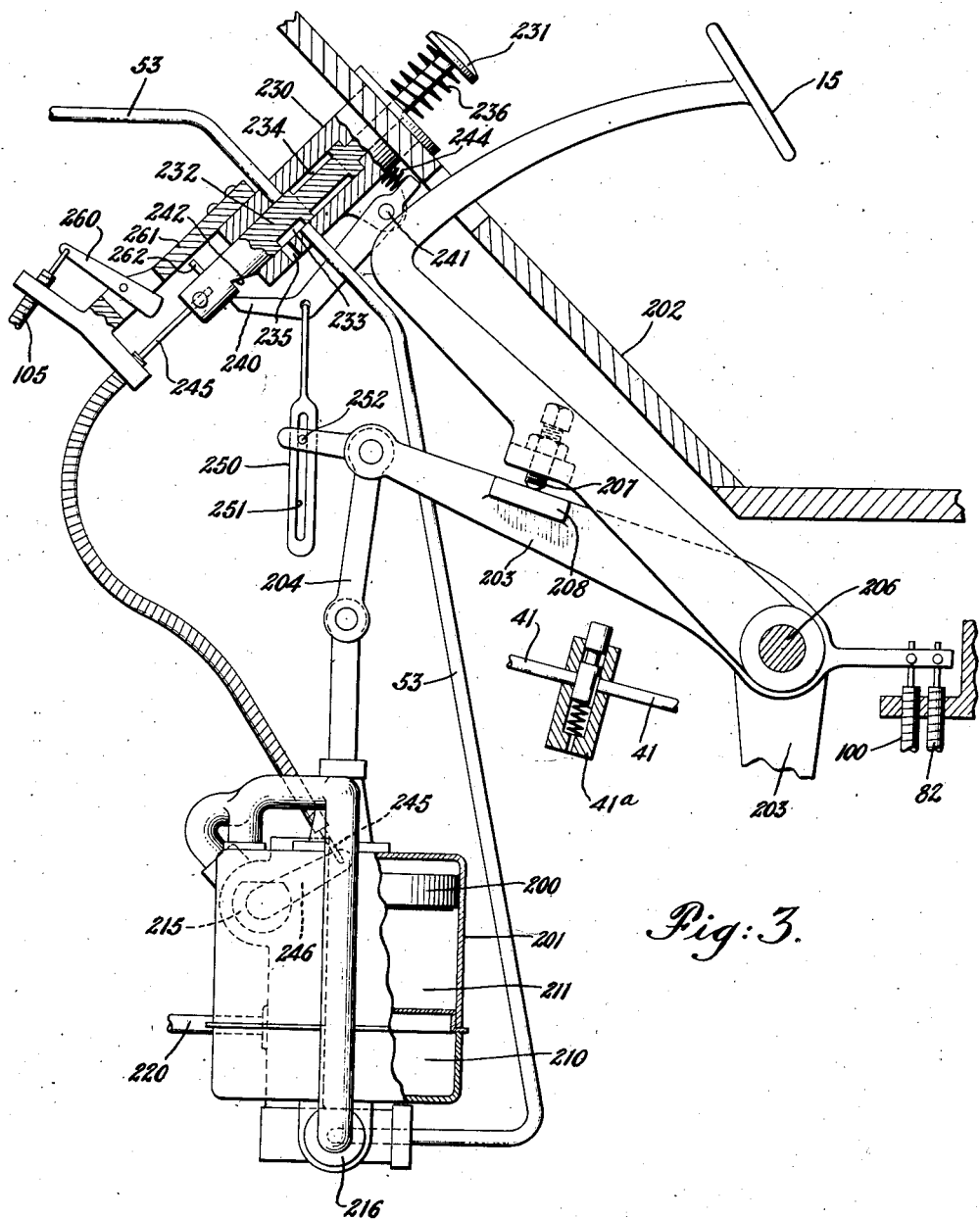

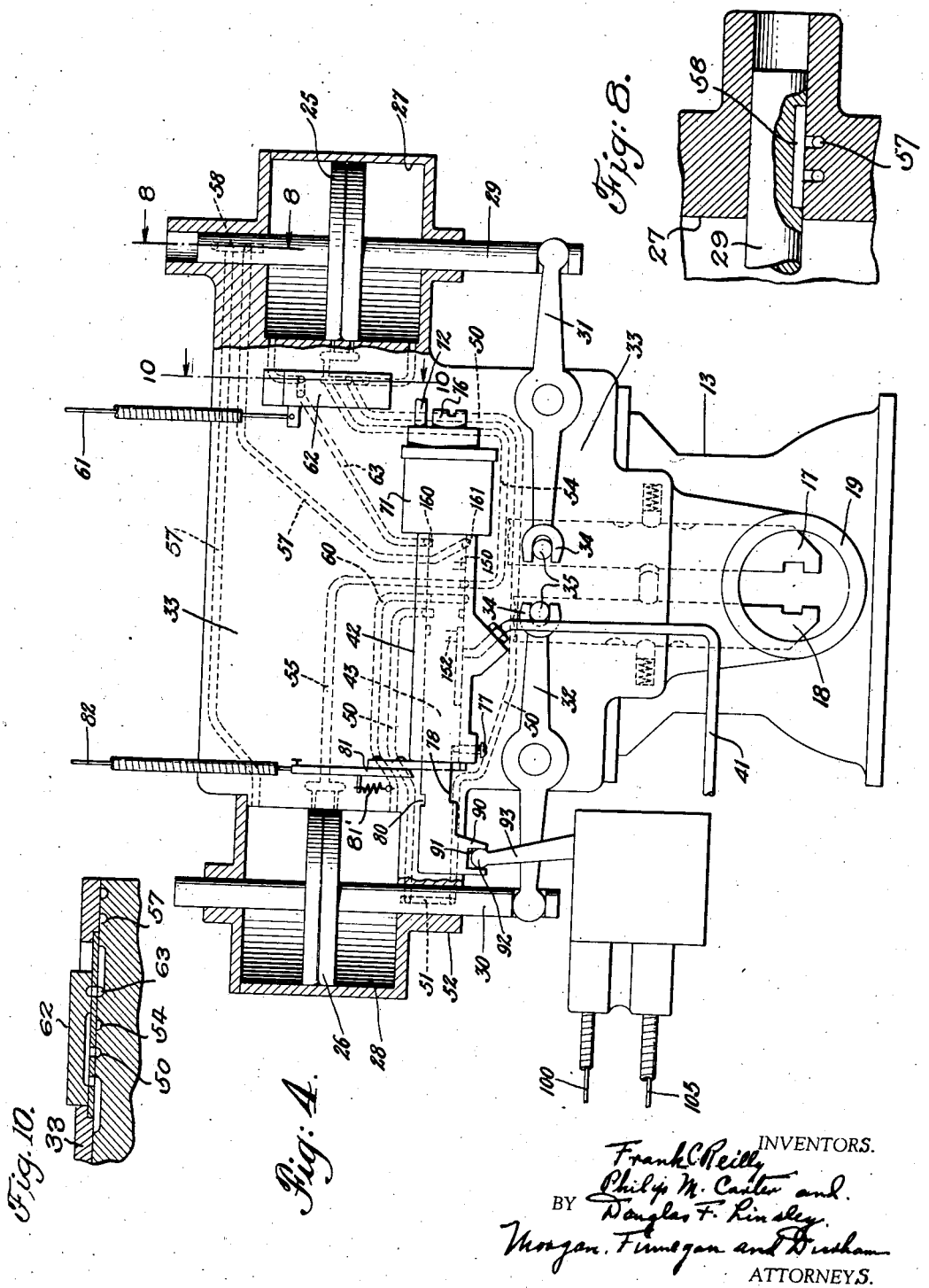

Patented June 6, 1939

2,161,088

UNITED STATES PATENT OFFICE 2,161,088

AUTOMOTIVE MECHANISM

Frank C. Reilly, New York, and Philip M. Carter, White Plains, N. Y., and Douglas F. Linsley, Norwalk, Conn., assignors to Vaco Products, Inc., a corporation of Delaware Application October 3, 1935, Serial No. 43,364

8 Claims. (Cl. 192—3.5)

The present invention relates to automotive vehicles and more particularly to a novel and improved automotive transmission including a power-operated clutch actuating and gear shifting mechanism.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a fragmentary diagrammatic plan view of an automotive vehicle embodying the present invention;

Figure 2 is a fragmentary detailed vertical cross-section of a control device utilized in the embodiment shown in Figure 1;

Figure 3 is a fragmentary diagrammatic view, with certain parts shown in section, of the clutch-controlling and actuating mechanism;

Figure 4 is a detailed plan view, with certain parts shown in section, of the power-operative means for shifting the transmission gears;

Figure 5 is a horizontal sectional view showing in detail the selector valve of the gear-shifting mechanism;

Figs. 5—A, 5—B, 5—C, 5—D and 5—E are fragmentary cross sections taken on the section lines A—A, B—B, C—C, D—D and E—E of Fig. 5.

Figures 6 and 7 are detailed sectional views of the manual control means for the selector valve;

Figure 8 is a fragmentary sectional view taken on the line 8—8 of Figure 4.

Figure 9 is a cross-sectional view of a modified form of clutch-actuating and controlling device.

Figure 10 is a detailed section taken on the line 10—10 of Figure 4.

The present invention has for its object the provision of a new and improved power-operated transmission for automotive vehicles and including a power-operated gear shifting device and a power-operated clutch controlling device. A further object of the invention is the provision of a novel and improved fluid pressure actuated clutch-controlling device in which both the engaging and disengaging of the clutch are easily and accurately controlled. Still another object of the invention is the provision of a novel and improved control for a power-actuated clutch insuring complete disengagement of the clutch each time it is actuated. Another object is the provision of a control device by which the power actuation of the clutch and the gear selection for the power shifter are controlled by a single control device. The present invention also provides such a mechanism which is adapted to be energized by vacuum applied from the intake of the automotive engine and is easily controlled by means of a single control member located adjacent one or the other of the operator's feet.

Referring now in detail to the illustrative embodiment of the invention as shown by the accompanying drawings, the embodiment of the invention is shown as applied to an automotive transmission having three forward and one reverse speeds and is adapted to be actuated by vacuum derived from the intake manifold of the automotive engine. As is usual, the internal combustion engine 10 is adapted to drive a propeller shaft 11 through a clutch 12, a selective shiftable gear transmission 13 and a universal joint 14. A clutch pedal 15 is provided for operating the clutch, and the clutch may also be operated by means of a power cylinder adapted to cause disengagement of the clutch.

The transmission unit 13 comprises the usual shiftable transmission gears which are moved into their respective speed positions by means of the gear shifting rods 17 and 18, slidably mounted in the transmission casing, and may be moved by suction in case of emergency by means of a lever to be positioned in the lever socket 19 at the rear of the transmission. As shown, the transmission is designed to produce three forward speeds and one reverse speed, and the rod 17 is moved forward to place the gears in first speed position, or rearwardly for reverse, while rod 18 is moved reversely to place the gears in second speed or forwardly to place the gears in third speed position.

The details of the power means provided for moving the rods 17 and 18 to their several positions to shift the transmission gears form no part of the present invention, and in the illustrative embodiment vacuum operated pistons 25 and 26 are provided slidably mounted in their respective double ended cylinders 27 and 28, one at either side of the transmission casing, and having their piston rods projecting through the ends of the cylinders and tightly, yet slidably, mounted therein.

At their rear ends the piston rods 29 and 30 are connected to their respective rods 17 and 18 by means of levers 31 and 32 pivotally mounted on the upper surface of the plate 33 forming the cover for the transmission casing. Levers 31 and 32 are connected to the rods 17 and 18 by means of their forked ends 34 and the pins 35 projecting upwardly to and anchored in the rods 17 and 18. Plate 33 is provided with slots (not shown) to allow for movement of the pins 35.

Means are provided for applying vacuum selectively and individually to the cylinders 27 and 28 as required to shift the gears from one position to another and this vacuum is advantageously derived from the intake manifold 40 of the engine 10, and is applied to the gear shifting mechanism through a main supply line 41 which is connected to the casing 42 surrounding the slidable selector valve body 43. As will be more fully described, this valve determining which of the cylinder ends is subjected to vacuum to move one or the other of the pistons 25 or 26 in one direction or the other. The selector valve has three positions: First speed or reverse, neutral, second speed and third speed, and may be moved from one or the other of its positions to any other positions to control the application of vacuum accordingly.

In its first speed position, the selector valve applies vacuum through line 50 to the rear face of piston 25, and this line is open from the selector valve to the cylinder 27 only when the piston 26 is in its neutral position, passing through the slide valve formed by the groove 51 in piston rod 30 where it passes through the boss 52 at the end of cylinder 28. Line 50 also passes through a reversing valve which will be described in connection with the reversing operation.

In its neutral position, the selector valve causes the application of vacuum from the manifold 40 to the lines 54 and 55 connected to the central portions of cylinders 27 and 28 respectively, and thereby tending to move both pistons to neutral position.

In second speed position, the selector valve causes the application of vacuum to the line 57 and thereby to the forward side of piston 26 provided the piston 25 is in its central or neutral position so as to open the slide valve 58 formed on the end of piston rod 29.

In high or third speed position, vacuum is applied through line 60 to the rear side of the piston 26 to move it rearwardly.

The selector valve 43 (shown in first speed position in Fig. 5) is also provided with suitable venting apertures, so that the cylinders are vented as the corresponding pistons are moved. Thus when the piston 26 is moving from second speed position to third speed position by the application of suction to the rear face of piston 26, the forward portion of the cylinder 28 is vented to atmosphere so that no resistance is offered to the movement of the piston.

As shown in Figure 5, valve body 43 is formed with suction ports 301, 303, 310, 330 and venting ports 160, 312, 322, 332, 333, the suction ports communicating with the hollow interior 302 of the valve body 43 and through port 301 with the main vacuum line 41. The suction ports are adapted to be selectively positioned in communication with the ports 304, 320, 331, 161 corresponding to the lines 50, 54, 55, 57, 60 and 63, while venting ports may be similarly positioned and in each valve position connect one or the other of the cylinder ports with a venting port in the valve body.

The operation of the selector valve may be described in greater detail, as follows:

With the selector valve in its extreme left position as shown in Figure 5, suction is applied to the main port 300, through passageway 301 to the hollow interior 302 of valve 43, from which it is applied through port 303 to the port 304 forming the end of port 50. Simultaneously, air is admitted from duct 308' through port 160 to port 307 forming the end of the reverse duct 63, and the difference in pressure thus established between the two faces of piston 25 causes the piston to move to its first speed position.

The selector valve is next moved by piston 70 through suction applied to it to the position where its left hand end 90 is opposite the numeral "2" in Figure 5, and at this time suction is applied to ports 310 and 161, which are then in register, and is thus applied to duct 57 serving to return the piston 25 to neutral position and thereafter move the piston 26 to second speed position. During this movement air is admitted to the first speed end of the cylinder 27 and the third speed end of cylinder 28, through port 304 and venting port 312, this air being first admitted to the cylinder 27 through duct 50 and groove 51, and thereafter to the cylinder 28 as soon as the piston 26 has been moved from neutral position.

When the operator next depresses the clutch pedal, the piston 70 and valve 43 are moved to third speed position, with the valve end 90 opposite the figure "3" in Figure 5. In this position, suction is applied directly from the right-hand end of passageway 301 to port 320 which is the end of duct 60, and the suction is thereby applied to the third speed end of cylinder 28. As the piston 26 moves, air is admitted to the other end of cylinder 28 through duct 57, groove 58, port 161 and port 322.

For shifting the gears to neutral position from first or reverse, the valve 43 is positioned in neutral with its end 90 opposite the letter "N" in Figure 5. In this position, ports 330 and 331 are in register and suction is applied through port 330 to port 331 and thence to duct 55 which communicates with the central portion of both cylinders 27 and 28. During this movement air is admitted to the first speed end of the cylinder 27 through port 333 which is then in register with port 304 of duct 50, or if the reversing valve 62 is in reverse position, the reverse end of cylinder 27 is vented through venting ducts 50 and 63 and a suitable bridging groove in the reversing valve slide 62. Venting ports 50', 60', 54', 57' and 308' correspond respectively to the first speed duct 50, third speed duct 60, neutral duct 54, second speed duct 57, and reverse duct 308.

For moving piston 25 to reverse position, a separate reversing valve is provided which may be manually moved from forward to reverse position by means of the push wire control 61. This reversing valve (shown in section in Figure 10) comprises a slide valve body 62 which can be moved forwardly and when so moved connects the first speed line 50 with a line 63 communicating with the forward portion of cylinder 27 to apply vacuum to the forward side of the piston 25.

The various lines 50, 54, 55, 57 and 60 may conveniently be formed as ducts in the cover plate 33 and are so shown in the drawings.

Means are provided for controlling the application of vacuum to the gear shifter by the position of the clutch, and for this purpose a master valve 41a is provided in the line 41 between the intake manifold 40 and the gear shifter, this valve being positioned adjacent to the clutch pedal 15 and adapted to be opened only by movement of the clutch pedal to clutch disengaging position, thereby preventing shifting of the gears while power is being transmitted through the transmission.

In the illustrated embodiment vacuum means are provided for urging the valve away from its first speed position, as shown in Figure 5 towards second and third speed positions, and other means are provided for controlling this movement in accordance with a predetermined schedule so that the movement is controlled by other necessary operations, as for instance by disengagements of the clutch.

For this purpose, and as shown in Figure 5, the selector valve body 43 is connected at its right end to a piston 70 operating within a small cylinder 71 at the right hand end of the valve casing 42 and connected thereto. Vacuum may be applied, to move the valve body 43 and piston 70 to the right, through a pipe 72 connected to the intake manifold 40 and under control of a master control unit so that vacuum is applied when the vehicle is set in motion.

Spring means are provided for urging the valve body to the left, towards neutral or first speed position, and for this purpose a spring 75 is compressed between the end of piston 70 and an adjusting screw 76 threaded into the end of the cylinder 71. Movement of the valve body 43 is limited by means of a set screw 77 threaded into the valve casing 42 and operating in a groove 78 formed in the valve body 43, also serving to hold the valve body against rotation.

Means are also provided for retaining the valve in second speed position while accelerating until the gears have been meshed in second speed position, thereby preventing unintential skipping of second speed, and for this purpose valve body 43 is formed with a notch 80 adapted to cooperate with a releasable latch 81 mounted adjacent thereto. Latch 81 is normally urged towards the valve body by spring 81' and into the notch 80, but may be withdrawn therefrom by means of the pull wire control 82, one end of wire 82 being connected to the latch while the other end is connected to be moved by clutch lever 203 as the clutch is engaged. Latch 81 is provided with an upper notch-engaging member 81a, and with a lower notch-engaging member 81b. The clearance between 81a and 81b is a little greater than the diameter of valve 43. This permits the valve to slide from one position to another as the latch is moved; when the latch is moved, the valve can go to third speed and can also be held in second speed. When latch 81 is fully withdrawn, the lower end 81b of the latch engages in groove 78 and holds the valve 43 against movement, in a position corresponding to second speed, until the clutch has been re-engaged. In order to go to third speed, the clutch pedal is operated to withdraw the upper latch engaging member 81a from its groove, but not sufficient to engage the lower latch-engaging member 81b with its groove, whereupon the valve moves to the third speed position. The valve-engaging end of latch 81 is beveled so that movement of the valve body 43 to the left, as on stopping, is unimpeded, and may also be manually released, if desired.

Other means are provided for moving the valve away from its normal or neutral position, and for moving the valve body 43 to second speed position from any of its other positions, as desired. As embodied, the valve body is hollow, and has fitted within it a rod 85 which is fixed to piston 70 at one end, and at its other end is headed to compress a spring 86 between the head and a shoulder 87 within the hollow part of the body 43, thereby permitting the valve body to move in one direction independently of the rod 85 and against the compression of spring 86.

Valve body 43 is formed with an enlarged head 90 having a socket 91 into which is fitted the rounded end 92 of a bell crank 93. Bell crank 93 is pivotally mounted and is normally held in the neutral position shown. When it is desired to move the valve to first speed position (extreme left) the clutch pedal 15 is depressed causing bell crank 93 and valve body 43 to be retracted. Bell crank 93 may be connected with the clutch lever 203 for operation by means of pull wire 100. Other means including wire 105 are also provided for moving the selector valve to second speed position. Where the movement of the valve body 43 is from third to second speed position, the valve may move against the compression of spring 86, rather than against the more powerful suction exerted on piston 70.

Means are provided for moving the valve to second speed and then to third speed positions when the vehicle has been set in motion, and for this purpose means are provided for controlling the application of vacuum to the piston 70. As embodied, there is provided a valve normally venting the line 72 when the vehicle is at rest, but causing suction to be applied thereto as soon as the vehicle has been set in motion or has attained a speed of from two to four miles per hour. This valve comprises a valve body 110 in which is slidably mounted a valve plunger 111 normally moved to venting position by means of a spring 112. Valve plunger 111 is provided with a vent 113 and a groove 114, groove 114 serving to connect lines 72 to line 73 which is, in turn, connected to the manifold 40. At one end of plunger 111 is provided a pair of small pivotally mounted weights 115, eccentrically mounted on shaft 117 and formed with cam toes 116 to engage and more plunger 111. As soon as the vehicle has been set in motion, the centrifugal force of weights 115 overpowers spring 112 moving the plunger 111 to open position. Drive shaft 117 is driven by worm gear 118 meshing with a worm 119 on the propeller shaft 11. A suitable casing and frame 120 is provided in which the shaft 117, weights 115 are mounted and lubricated.

The clutch actuating device comprises a piston 200 slidably mounted in a cylinder 201 positioned beneath the floor board 202 and connected to a clutch operating lever 203 by means of link 204. Lever 203 and pedal 15 are coaxially mounted on a shaft 206, lever 203 being fixed to the shaft, while pedal 15 is loosely mounted on the shaft and moves the shaft through set screw 207 and ledge 208.

As shown in Figure 3, the clutch actuating device is of the type more fully described in the pending application of Gilbert E. Porter, Serial No. 740,882, now Patent No. 2,090,152, and in which the cylinder is provided with an auxiliary reservoir chamber 210 into which air under pressure is forced by the compressive action of the clutch engaging spring to cause a cushion engagement of the clutch after which the reservoir 210 and vacuum side 211 of the piston are vented to atmosphere to cause a full or driving engagement of the clutch. The application of vacuum to the piston 200, the charging of the reservoir 210, and the venting of the cylinder and reservoir 210, are under control of the valves 215 and 216, which control the application of vacuum from the main vacuum line 53 and the venting through the vent pipe 220 which is connected to the breather pipe 221 of the engine crank case.

The control means for operating the valves 215 and 216 comprises a valve 230 mounted on the under side of the floor board 202, with an enlarged button 231 projecting through the floor board and positioned closely adjacent to the clutch pedal 15. Button 231 is connected to the valve slide 232 which is formed with a venting port 233 and a connecting port 234. Venting port 233 is adapted to connect the clutch cylinder with atmosphere through port 235, while port 234 is adapted to connect the cylinder to the intake manifold to line 53. A spring 236 is provided for normally maintaining the valve in the position shown in Figure 3, and a detent 240 pivoted at 241 on the valve body is resiliently urged towards the lower end of the valve slide and into notch 242 by means of spring 244, serving to hold the valve slide in its depressed position until released. The lower end of valve slide 232 is connected to a wire cable 245 which is also connected to the valve-operating arm 246 so that movement of the valve slide also controls the operation of valves 215 and 216. Valves 215 and 216 are suitably connected for simultaneous operation.

Means are provided for releasing the detent 240 as the clutch is fully disengaged, and for this purpose a link 250 is pivotally mounted on the detent 240 and is provided with an elongated slot 251 in which slides a pin 252 mounted on the end of lever 203, so that as the clutch is fully disengaged, link 250 is moved to release the detent 240.

In the operation of the clutch-actuating mechanism, the button 231 may be depressed slightly, causing movement of the valve 215 and 216, to partially disengage the clutch, while further movement of the button 231 will latch the valve slide 232 and hold it in clutch-disengaging position until the clutch is fully disengaged, whereupon the valve slide may return to its original position, and this return may be regulated by the operator's foot so as to give as slow a clutch engagement as may be desired. When the clutch-operating lever 203 is in fully disengaged position, the main shifter valve 41a is held open by engagement with the clutch lever 203 to apply suction to the shifter, causing the gear to be shifted to the position determined by the position of the selector valve.

Means are also associated with the clutch controlling device for moving the selector valve to second speed position, and as embodied the optional second speed control wire 105 is connected to a lever 260 pivotally mounted on the bracket 261 and projecting into the path of a pin 262 at the lower end of valve slide 232 so that upon extreme movement of the valve 232, lever 260 is rocked by pin 262 on slide 232 to pull the selector valve to second speed position, and upon disengagement of the clutch and opening of the main shifter control valve 41a, the gears are shifted to second speed, detent 240 is released, and the clutch may be re-engaged when the foot is removed from button 231.

Referring now to the clutch actuating mechanism shown in Figure 9 of the drawings, means are provided for moving the clutch operating lever to any desired position under absolute control of the operator, the movement of the clutch actuating piston being proportional to the movement of the clutch control button 231. As embodied, there is provided a cylinder 270 within which is a piston 271, guided by means of a piston rod 272, which in turn is connected to the clutch lever 203 by means of the link 204. Piston rod 272 passes through a boss 274 in one end wall of the cylinder which is fitted to the rod to prevent leakage.

Means are provided for controlling the application of vacuum or other fluid pressure to the piston 271, and for this purpose there is provided a rod-like valve slide 275 slidably mounted in apertures in the end walls of the cylinder 270, and adapted to be moved by and under control of the clutch button 231 through push wire 245. The valve slide 275 passes through an aperture 277 in the piston 271, aperture 277 being alined with the cylinder end wall apertures. Valve slide 275 is provided with a longitudinal channel 278 slightly longer than the thickness of the piston 271 and positioned so that it can form a passageway for fluid between the two sides of the piston 271. Slide 275 is also formed with ports 279 and 280, interconnected by means of a longitudinal duct 281, so that vacuum may be applied to the under side of piston 271 from the elongated port 282 formed in the cylinder end wall extension 283 which communicates with the vacuum line 53.

Means are also provided for limiting relative movement of the valve slide 275 and piston 271 and for this purpose stops 285, 286 are provided on the slide 275, spaced slightly farther apart than the thickness of the piston 271, and these stops also serve to limit movement of the valve slide with reference to the end walls of the cylinder. Stop 286 may be omitted for more rapid operation.

For preventing too sudden engagement of the clutch even if the foot is suddenly removed from the clutch control button 231, a regulable vent is provided of the upper end of the cylinder regulating the venting of the cylinder. As embodied, there is provided a duct 287 in which is threaded a pointed screw 288 acting as a needle-valve to regulate the flow of fluid out of the upper half of the cylinder 270, and consequently the flow of fluid from the lower to the upper side of the piston 271.

If desired, a return spring 290 may be provided for the piston rod 272.

In the operation of the modified form of clutch actuator shown in Figure 9, the operator depresses the clutch control button, applying vacuum to the lower side of the piston 271 through port 279 and causing the disengagement of the clutch. The piston moves downwardly until port 279 is closed, whereupon movement of the piston is automatically stopped. The operator may thereupon release the button 231 suddenly, or preferably gradually, causing the pressure on opposite sides of the piston to be equalized by the flow of fluid through duct 278 while the upper half of cylinder 270 is vented through the regulable needle valve 288.

The invention in its broader aspects is not limited to the specific mechanisms shown and described but departures may be made therefrom within the scope of the accompanying claims without departing from the principles of the invention and without sacrificing its chief advantages.

What we claim is:

1. In an automotive vehicle having an internal combustion engine, a clutch and transmission, the combination of a power cylinder for actuating the clutch, manual control means for energizing the cylinder and means operated by disengagement of the clutch for restoring the control means to a normal position.

2. In an automotive vehicle having an internal combustion engine, a clutch and transmission, the combination of a power cylinder for actuating the clutch, a manual control for controlling disengagement of the clutch by said cylinder, a detent holding the control in disengaging position and means operated by disengagement of the clutch for releasing said detent.

3. In an automotive vehicle having an internal combustion engine, a clutch and transmission, the combination of a fluid pressure actuator for the clutch, a manually operated valve for effecting disengagement of the clutch by said actuator, a detent holding the valve in disengaging position and means operated by disengagement of the clutch for releasing said valve.

4. In an automotive vehicle having an internal combustion engine, a clutch, a shiftable gear transmission, fluid pressure means for shifting said gears and a clutch controlled valve for controlling the application of pressure to said shifting means, the combination of a power cylinder for actuating the clutch, a manual control for controlling disengagement of the clutch by said cylinder, a detent holding the control in disengaging position and means operated by disengagement of the clutch for releasing said clutch.

5. In an automotive vehicle having an internal combustion engine, a clutch, a shiftable gear transmission, fluid pressure means for shifting said gears and a clutch controlled valve for controlling the application of pressure to said shifting means, the combination of a fluid pressure actuator for the clutch, a manually operated valve for effecting disengagement of the clutch by said actuator, a detent holding the valve in disengaging position and means operated by disengagement of the clutch for releasing said valve.

6. In an automotive vehicle having an internal combustion engine, a clutch, a shiftable gear transmission, fluid pressure means for shifting said gears, the combination of fluid pressure means for operating said clutch, valve means for controlling the shifting of said gears to an intermediate speed, a manual control means controlling said clutch operating means and valve means, a detent holding said control means away from a normal position and means operated by the disengagement of the clutch for releasing said detent.

7. In an automotive vehicle having an internal combustion engine, a clutch, a shiftable gear transmission, fluid pressure means for shifting said gears, the combination of fluid pressure means for operating said clutch, valve means for controlling the shifting of said gears to an intermediate speed, a manual control means controlling said clutch operating means and valve means, a valve controlling the application of pressure to the shifting means and opened by disengagement of the clutch, a detent holding said control means away from a normal position and means operated by the disengagement of the clutch for releasing said detent.

8. In an automotive vehicle, the combination of a clutch, a cylinder, a piston movable therein and connected to operate the clutch, a valve slidably mounted in the piston and controlling the application of fluid pressure to the piston for moving the piston to any position in the cylinder, a manual control for the valve, detent means for holding the manual control in clutch disengaging position and means operated by disengagement of the clutch for releasing the detent.

FRANK C. REILLY.
PHILIP M. CARTER.
DOUGLAS F. LINSLEY.